(12) United States Patent
Brandwine et al.

(10) Patent No.: US 10,178,119 B1
(45) Date of Patent: Jan. 8, 2019

(54) CORRELATING THREAT INFORMATION ACROSS MULTIPLE LEVELS OF DISTRIBUTED COMPUTING SYSTEMS

(71) Applicant: Amazon Technologies, Inc., Seattle, WA (US)

(72) Inventors: Eric Jason Brandwine, Haymarket, VA (US); Robert Eric Fitzgerald, Herndon, VA (US); Alexander Robin Gordon Lucas, Cheltenham (GB)

(73) Assignee: Amazon Technologies, Inc., Seattle, WA (US)

( * ) Notice: Subject to any disclaimer, the term of this patent is extended or adjusted under 35 U.S.C. 154(b) by 180 days.

(21) Appl. No.: 15/085,271

(22) Filed: Mar. 30, 2016

(51) Int. Cl.
*H04L 29/06* (2006.01)
*H04L 29/08* (2006.01)
*H04L 12/26* (2006.01)

(52) U.S. Cl.
CPC .......... *H04L 63/1433* (2013.01); *H04L 43/10* (2013.01); *H04L 63/1416* (2013.01); *H04L 63/1425* (2013.01); *H04L 67/10* (2013.01); *H04L 67/22* (2013.01)

(58) Field of Classification Search
None
See application file for complete search history.

(56) References Cited

U.S. PATENT DOCUMENTS

| | | |
|---|---|---|
| 6,769,066 B1 | 7/2004 | Botros et al. |
| 6,971,019 B1 | 11/2005 | Nachenberg |
| 7,016,351 B1 | 3/2006 | Farinacci et al. |
| 7,209,473 B1 | 4/2007 | Mohaban et al. |
| 7,257,689 B1 | 8/2007 | Baird |
| 7,616,579 B2 | 11/2009 | Slattery et al. |
| 7,840,670 B2 | 11/2010 | Hedayat et al. |
| 8,238,834 B1 | 8/2012 | Bharghavan et al. |
| 8,307,422 B2 | 11/2012 | Varadhan et al. |
| 8,443,354 B1 | 5/2013 | Satish et al. |
| 8,549,641 B2 * | 10/2013 | Jakobsson ............. G06F 21/552 726/23 |
| 8,788,833 B2 | 7/2014 | Fukui |
| 8,931,107 B1 | 1/2015 | Brandwine |
| 9,032,531 B1 | 5/2015 | Scorvo et al. |
| 9,189,627 B1 | 11/2015 | Islam |

(Continued)

OTHER PUBLICATIONS

Arpaci-Dusseau et al. "Log-structured File Systems," Operating Systems Version 0.91, www.ostep.org, 2014, 15 pages.

(Continued)

*Primary Examiner* — Christopher A Revak
(74) *Attorney, Agent, or Firm* — Davis Wright Tremaine LLP

(57) ABSTRACT

Customers of a computing resource service provider may operate one or more computing resource provided by the computing resource service provider. In addition, the customers may implement security applications and/or devices using the one or more computing resources provided by the computing resource service provider. Operational information from customer operated computing resources may be correlated with operational information from computing resources operated by the computing resource service provider or other entities and correlated threat information may be generated. Anomalous activity may be detected based at least in part on the correlated threat information.

20 Claims, 8 Drawing Sheets

(56) References Cited

U.S. PATENT DOCUMENTS

| | | |
|---|---|---|
| 9,462,013 B1 | 10/2016 | Boss et al. |
| 9,501,345 B1 | 11/2016 | Lietz et al. |
| 9,521,053 B1 | 12/2016 | Chen et al. |
| 9,565,204 B2 | 2/2017 | Chesla |
| 9,609,399 B2* | 3/2017 | Krishnamurthy ...... G08B 25/14 |
| 9,621,516 B2 | 4/2017 | Basak et al. |
| 9,654,543 B2 | 5/2017 | Yamashima et al. |
| 2001/0013105 A1 | 8/2001 | Kang et al. |
| 2003/0084321 A1 | 5/2003 | Tarquini et al. |
| 2003/0188189 A1 | 10/2003 | Desai et al. |
| 2003/0204619 A1 | 10/2003 | Bays |
| 2004/0003290 A1 | 1/2004 | Malcolm |
| 2004/0049693 A1 | 3/2004 | Douglas |
| 2004/0064713 A1 | 4/2004 | Yadav |
| 2004/0243707 A1 | 12/2004 | Watkinson |
| 2004/0250169 A1 | 12/2004 | Takemori et al. |
| 2004/0268150 A1 | 12/2004 | Aaron |
| 2005/0265331 A1 | 12/2005 | Stolfo |
| 2005/0289649 A1 | 12/2005 | Mitomo et al. |
| 2006/0010289 A1 | 1/2006 | Takeuchi et al. |
| 2006/0053490 A1 | 3/2006 | Herz et al. |
| 2007/0180490 A1 | 8/2007 | Renzi et al. |
| 2007/0186284 A1 | 8/2007 | McConnell |
| 2007/0263553 A1 | 11/2007 | Bharali et al. |
| 2007/0288247 A1 | 12/2007 | Mackay |
| 2008/0148381 A1 | 6/2008 | Aaron |
| 2008/0163207 A1 | 7/2008 | Reumann et al. |
| 2008/0189793 A1 | 8/2008 | Kirkup et al. |
| 2008/0258880 A1 | 10/2008 | Smith et al. |
| 2008/0301175 A1 | 12/2008 | Applebaum et al. |
| 2009/0007100 A1 | 1/2009 | Field et al. |
| 2009/0070283 A1 | 3/2009 | Kang et al. |
| 2009/0125573 A1 | 5/2009 | Hardy |
| 2009/0150998 A1 | 6/2009 | Adelstein et al. |
| 2009/0249472 A1 | 10/2009 | Litvin et al. |
| 2010/0031093 A1 | 2/2010 | Sun et al. |
| 2010/0075751 A1 | 3/2010 | Garvey et al. |
| 2010/0083382 A1 | 4/2010 | Farley et al. |
| 2010/0161960 A1 | 6/2010 | Sadasivan |
| 2011/0060725 A1 | 3/2011 | Lunde |
| 2011/0072486 A1 | 3/2011 | Hadar et al. |
| 2011/0138441 A1 | 6/2011 | Neystadt et al. |
| 2011/0231361 A1 | 9/2011 | Patchava et al. |
| 2012/0260342 A1 | 10/2012 | Dube et al. |
| 2013/0024567 A1 | 1/2013 | Roxburgh et al. |
| 2013/0128751 A1 | 5/2013 | Keesara et al. |
| 2013/0179574 A1 | 7/2013 | Calder et al. |
| 2013/0212709 A1 | 8/2013 | Tucker |
| 2014/0029449 A1 | 1/2014 | Xu et al. |
| 2014/0173111 A1 | 6/2014 | Varner |
| 2014/0237599 A1 | 8/2014 | Gertner et al. |
| 2014/0245423 A1 | 8/2014 | Lee |
| 2014/0283085 A1 | 9/2014 | Maestas |
| 2014/0320886 A1 | 10/2014 | Uchikawa |
| 2014/0331304 A1 | 11/2014 | Wong |
| 2014/0351810 A1 | 11/2014 | Pratt et al. |
| 2015/0043578 A1 | 2/2015 | Fidler et al. |
| 2015/0081863 A1 | 3/2015 | Garg et al. |
| 2015/0082039 A1 | 3/2015 | Stalzer et al. |
| 2015/0143478 A1 | 5/2015 | Luckett, Jr. et al. |
| 2015/0207813 A1 | 7/2015 | Reybok et al. |
| 2015/0222656 A1 | 8/2015 | Haugsnes |
| 2015/0237013 A1 | 8/2015 | Bansal et al. |
| 2015/0264084 A1 | 9/2015 | Kashyap et al. |
| 2015/0288768 A1 | 10/2015 | Goyal et al. |
| 2015/0355957 A1* | 12/2015 | Steiner ................ G06F 11/0772 714/37 |
| 2015/0381641 A1* | 12/2015 | Cabrera .............. H04L 63/1425 726/23 |
| 2016/0014189 A1 | 1/2016 | Yamashima et al. |
| 2016/0119365 A1 | 4/2016 | Barel |
| 2016/0164919 A1 | 6/2016 | Satish et al. |
| 2016/0191547 A1 | 6/2016 | Zafar et al. |
| 2016/0283259 A1 | 9/2016 | Mehta |
| 2016/0306751 A1 | 10/2016 | Amarendran et al. |
| 2017/0005986 A1 | 1/2017 | Bansal et al. |
| 2017/0063786 A1 | 3/2017 | Pettit et al. |
| 2017/0063927 A1 | 3/2017 | Schultz et al. |
| 2017/0099195 A1 | 4/2017 | Raney |
| 2017/0109310 A1 | 4/2017 | Takahashi et al. |
| 2017/0155673 A1* | 6/2017 | Desai .................. H04L 63/1425 |
| 2017/0171231 A1 | 6/2017 | Reybok, Jr. et al. |
| 2017/0279847 A1* | 9/2017 | Dasgupta ............ H04L 63/1458 |
| 2017/0302673 A1 | 10/2017 | Makhervaks et al. |

OTHER PUBLICATIONS

Rosenblum et al., "The Design and Implementation of a Log-Structured File System," University of California at Berkley, ACM Transactions on Computer Systems vol./Issue 10(1):26-52, Feb. 1992.

Check Point, "Firewall Administration Guide," Version R77, Dec. 6, 2015, found at http://d13.checkpoint.com/paid/79/7916511f80908c3056af526bae304602/CP_R77_Firewall_AdminGuide.pdf?HashKey=1511120649_66bcd3456845e431d368051b8d73769&xtn=. pdf., 13 pages.

* cited by examiner

CORRELATING THREAT INFORMATION ACROSS MULTIPLE LEVELS OF DISTRIBUTED COMPUTING SYSTEMS

CROSS-REFERENCE TO RELATED APPLICATIONS

This application incorporates by reference for all purposes the full disclosure of co-pending U.S. patent application Ser. No. 15/085,554, filed concurrently herewith, entitled "CORRELATING THREAT INFORMATION ACROSS SOURCES OF DISTRIBUTED COMPUTING SYSTEMS," co-pending U.S. patent application Ser. No. 15/085,585, filed concurrently herewith, entitled "BLOCK-LEVEL FORENSICS FOR DISTRIBUTED COMPUTING SYSTEMS," co-pending U.S. patent application Ser. No. 15/085,608, filed concurrently herewith, entitled "HOST-BASED FIREWALL FOR DISTRIBUTED COMPUTER SYSTEMS," co-pending U.S. patent application Ser. No. 15/085,257, filed concurrently herewith, entitled "SOURCE SPECIFIC NETWORK SCANNING IN A DISTRIBUTED ENVIRONMENT," and co-pending U.S. patent application Ser. No. 15/085,708, filed concurrently herewith, entitled "TRANSPARENT VOLUME BASED INTRUSION DETECTION."

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate the utilization of data center resources, virtualization technologies may allow a single physical computing machine to host one or more instances of virtual machines that appear and operate as independent computer machines to a connected computer customer. With virtualization, the single physical computing device can create, maintain, or delete virtual machines in a dynamic manner.

In a large distributed computing system (e.g., multiple distributed data centers) of a computing resource service provider, various customers, services, and resources of the computing resource service provider are in frequent communication with each other. Keeping the system secure becomes more challenging as applications are updated and as the complexity and usage of the system increases. In such distributed computing systems, it can be difficult to identify the vulnerabilities of the system. Furthermore, it can also be difficult to isolate and troubleshoot issues with the system, and even when issues are identified, reliably securing the system may be challenging. Additionally, many conventional systems rely upon manual mitigation of such vulnerabilities. The complexity and distribution of computing resources in these environments may make it difficult to collect and analyze log information generated by the computing resources.

BRIEF DESCRIPTION OF THE DRAWINGS

Various techniques will be described with reference to the drawings, in which.

DETAILED DESCRIPTION

Figure 1:
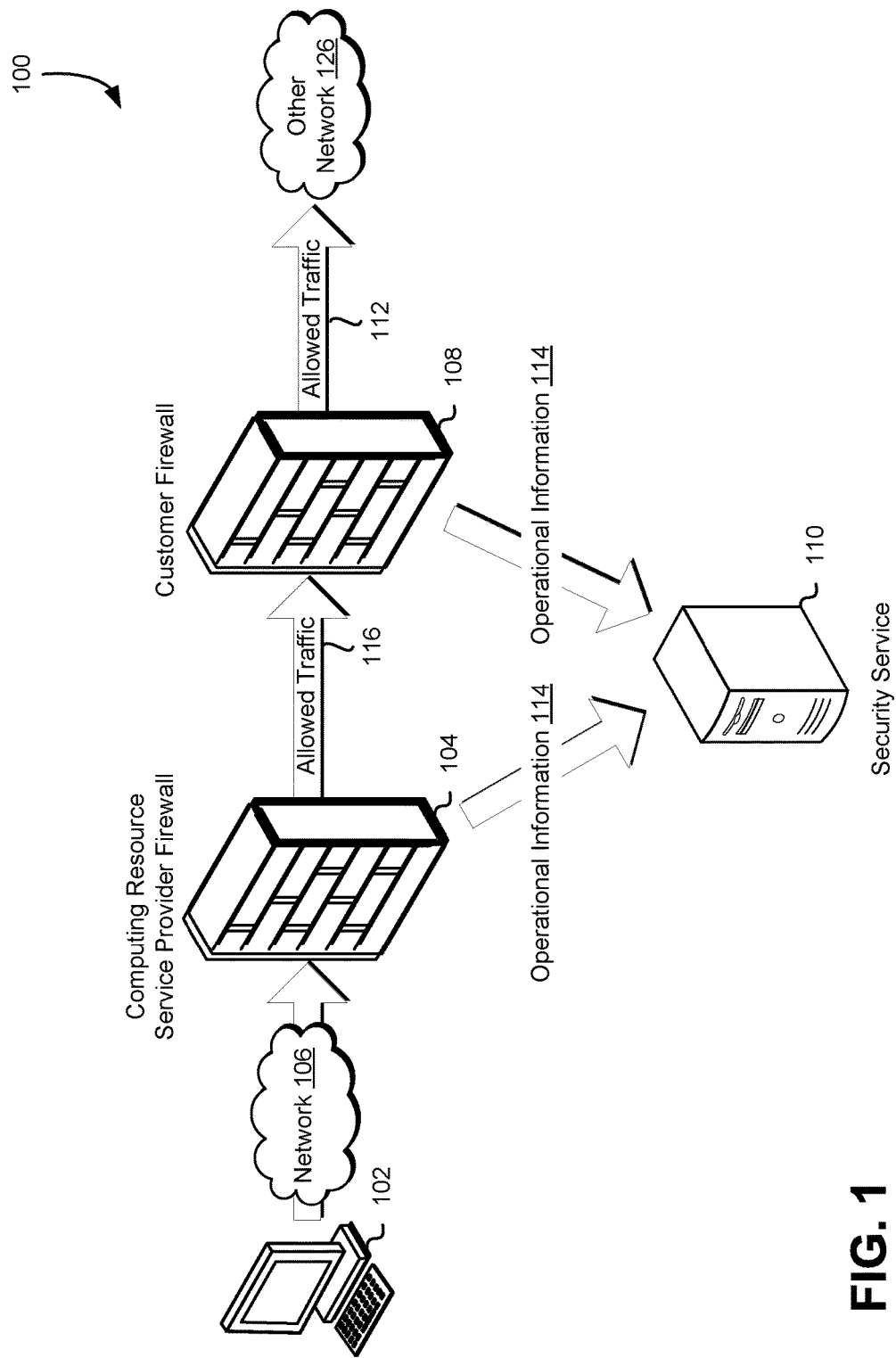
FIG. 1 illustrates an environment in which operational information from different sources may be obtained by a security service in accordance with at least one embodiment.

In various examples described below, information obtained from various sources collected, analyzed, and correlated to generate threat intelligence and other information suitable for detecting, mitigating, and preventing attacks on computer systems. Operational information, such as logs, are obtained from various sources including customer-operated virtual machines, firewalls, intrusion detection systems, intrusion prevention systems, host-based firewalls, routers, switches, network adapter, and any other computing resource operated by the customer. In addition, operational information may be obtained by various computer systems and service provided by a computing resource service provider. For example, logs may be obtained from various services offered by the computing resource service provider such as a security service, firewall service, networking service, virtual machine service, load balancing service, policy service, storage service, and/or any other service provided by the computing resource provider. The various services may be executed by computer systems and/or server computers, described in greater detail below, which may be distributed over a variety of different locations or regions as well as different networks.

The operational information collected from customer operated computing resources and computing resource service provider operated computing resources may be collected at one or more central locations, such as a security service, and correlated to generate a unified security model. For example, the security service may correlate events detected at the hypervisor level and below with events detected by applications executed above the hypervisor level. The events detected at the hypervisor level and below may be detected by computing resources operated by the computing resource service provider and the events detected by applications executed above the hypervisor level may be detected by computing resources operated by the customer. Additionally, events may be correlated across customers, service provides, regions, networks, and other locations from which operational information may be obtained.

Customers may provide the security service with access to operational information generated by customer operated computing resources, for example, by publishing logs to an event streaming service. Furthermore, the customer may be provided with notifications when the security service detects anomalous activity or other security events based at least in part on correlated security model. The operational information may include any event detected and recorded by computer systems including file system activity, network activity, process execution, dynamic object loading, or other operations performed by the computer system. The operational information may be correlated by at least clustering events based at least in part on similar features or sets of features and determining threat level associated with the clusters. Other methods of correlating the operational information may include statistical methods, machine learning, and heuristics.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which operational information 114 may be collected by a security service 110 from various locations in accordance with at least one embodiment. Computer systems 102 connected to a network 106, such as the internet or other public network, may attempt to communicate with and/or access computing resources connected one or more other networks 126. For example, a customer of a computing resource service provider may utilize computing resources of the computing resource service provider to implement a virtual network including a public and private subnet. Attackers, operating computer systems 102, may attempt to detect vulnerabilities in the customer's virtual network using a variety of different techniques distributed over both customer computing resources and computing resource service provider-computing resources.

In the example illustrated in FIG. 1, the computing resource service provider may operate a firewall as well as the customer. The firewalls illustrated in FIG. 1 are used for illustrative purpose only and operational information may be collected from any number of computing resources as described herein. Returning to FIG. 1, the computer systems 102 may direct traffic to a destination within the one or more other networks 126, the traffic may be allowed 116 or blocked by the computing resource service provider firewall 104. In addition the customer firewall 108 may allow 112 or block traffic. The operation of both the computing resource service provider firewall 104 and the customer firewall 108 may be recorded in a log or other data structure and may be considered operational information 114. The log may include a variety of events and other information. For example, the customer firewall 108 log may indicate an Internet Protocol (IP) address, a port number, protocol, and other information associated with traffic received at the customer firewall 108. The customer may provide this log information to the security service 110, for example, by periodically or aperiodically storing the log information in a storage device and/or storage service accessible by the security service 110.

In addition, the computing resource service provider may provide the log information to a metrics service or intrusion detection service. The metrics service may generate visualizations, alerts, and other information corresponding to the log information and/or correlate threat information, described in greater detail below, on behalf of the customer. For example, the metrics service may provide the customer with current network load on the customer's virtual computer system instance including connection attempts and threat scores associated with IP address corresponding to the connection attempts. The intrusion detection service may use the correlated threat information generated based at least in part on the operational information 114 to perform various attack mitigation and attack detection operations. Furthermore, the intrusion detection system may use the correlated threat information to update firewall settings, intrusion detection settings, and other security settings of various computing systems operated by the computing resource service provider and/or the customer. An intrusion prevention system may also use the correlated threat information to determine and apply a set of security policies. For example, the intrusion prevention system may limit the types of data that may be transmitted by or obtained from a customer virtual computer system instance or received by computing resources connected to the one or more other networks 126.

Operational information 114 may be obtained from multiple sources and levels from within both the customer environment and the computing resource service provider environment. The customer environment may include any computing resources operated by the customer or configured to perform various operations on behalf of the customer. Sources of operational information 114 from within the customer environment may include operating system, security controls that the customer has enabled within the operating system, application frameworks (e.g., Apache or Rails (RTM)), applications, agents, or other executable code or computer systems operated by the customer. The operational information 114 may include configuration information or other information indicating a setting or operation of the source. For example, the operational information 114 includes configuration information for the customers Apache webserver indicating the Secure Sockets Layer (SSL) is disabled. The operational information 114 may also include customer behavior. For example, a customer may always grant computing resource read and write access to on-demand storage devices, but the customer may never write to the on-demand storage devices and may only read information from the on-demand storage devices. The security service 110 may generate a correlated security model based at least in part on the operational information and may correlate information across customers, services of the service provider, sources, and computer systems. For example, the security service 110 may generate a correlated security model based at least in part on configuration information for customer's webserver, service provider operated firewall, and customer operated Intrusion Detection System.

The security service 110 or other service of the computing resource service provider, such as the log service described in greater detail below, may anonymize operational information 114. For example, any reference to the customer or metadata corresponding to the customer may be removed from the operational information 114 prior to using the operational information to generate the correlated threat information and/or correlated security model. In another example, a whitelist of operational information required to generate correlated information may be generated and only information on the whitelist, such as IP address, subnet, resource utilization, or other information, is provided to the security service 110. In addition, the security service 110 may correlate operational information 114 with correlated threat information and/or correlated security models. For example, the computing resource service provider may analyze operational information 114 obtained from the computing resource service provider firewall 104 to generate correlated threat information indicating that a particular set of IP addresses are associated with anomalous activity. The security service 110 may then correlate the operational information 114 obtained from the customer firewall 108 with the correlated threat information described above (i.e., the correlated threat information indicating that the particular set of IP addresses are associated with anomalous activity) instead of or in addition to correlating with the operational information 114 obtained from the computing resource service provider firewall 104. In another example, the security service may correlate information across the various sources and customers, such as operating systems, agents, and services. For instance, the security service may detect a horizontal port scan (e.g., a scan of one or more ports across multiple customers) by at least correlating firewall information from various customers with operating system information from the various customers. Correlating the information across the various sources and customers may indicate a source of the malicious activity as well. Returning to the example above, the source of the horizontal port scan may be indicated by correlating firewall information from a first customer with network telemetry from a second customer.

Figure 2:
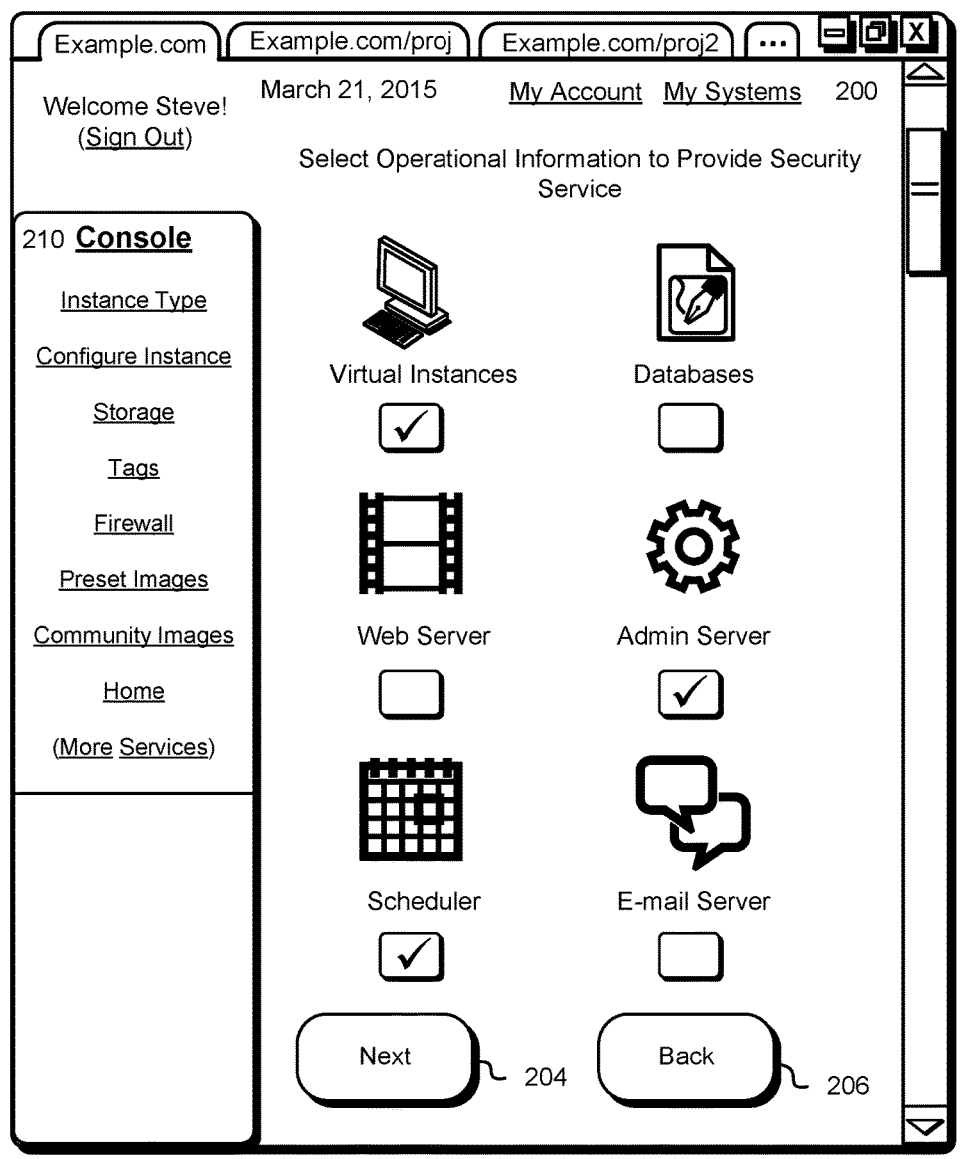
FIG. 2 is a diagram illustrating a management console exposed as a webpage in accordance with at least one embodiment.

FIG. 2 shows a webpage 200 which may be displayed by an application executed by a computing system enabling a customer to interact with a security service operated by the computing resource service provider. As illustrated in FIG. 2, the webpage 200 includes various graphical user interface elements that enable customers to provide access to operational information such as logs or other data structures configured to record operations and/or events of computing resources through a management console of which the webpage 200 is a part. In various embodiments, the customer interacts with the security service by issuing commands through the management console. The webpage 200 may be displayed by various applications, such as a mobile application or web browser. In this example, the webpage 200 includes various navigational features. For instance, on the left-hand side of the webpage 200, various links 210 may link to one or more other webpages that contain additional content corresponding to a variety of different actions the customer may cause to be performed.

The console pages may correspond to operations that may be taken to manage or otherwise control the security service or other computing services of the computing resource service provider. In this example, the links appear as textual words which enable the links to be selected using an appropriate input device such as a keyboard, mouse, touchscreen or other input device. Selection of one of the links 210 may cause an application displaying the webpage 200 to submit, pursuant to a URL associated with the selected link by the programming of the webpage 200, an HTTP request for the content associated with the link to a server that provided the webpage 200 or another server.

In this example, the webpage 200 also includes a graphical customer element configured as a "next" button 204. The next button 204 may be a graphical user interface element of the webpage 200 where the underlying code of the webpage 200 is configured such that selection by an input device of the next button 204 causes information corresponding to the selection of a particular operational information selected on the webpage 200 to be transmitted to the security service or other service of the computing resource service provider. For example, the selecting of the next button 204 may cause a log service to receive the customer's selection of operational information and, as a result, may cause the log service to begin to stream log events corresponding to the customer's selection to the security service.

Furthermore, through the management console, the customer may be guided through the process of selecting particular operational information to be provided to the security service. For example, the customer may be prompted to select providing operational information from the customer's host-based firewall and may be prompted not to select providing operational information from the customer's inventory database. In this manner, the operational information to be correlated may be limited to operational information that may include more valuable and/or appropriate threat information. In addition, the customer may limit or select particular events or portions of operational information to provide to the security service. For example, the customer may provide the security service with network connection information from the customer's virtual machines but may not allow access to process identification information from the customer's virtual machines. The process may be divided into steps and the customer may be prompted to provide information at each step. For example, the webpage 200 displays to the customer a list of different types of computing systems suitable for providing operational information. The customer, using an input device, may select a set of computing systems to provide the operational information. The customer selection may be stored until the entire process is completed or the customer selection may be transmitted to the security service upon selection of a graphical user interface element.

As illustrated in FIG. 2, the webpage 200 may contain a graphical user interface element configured as icons displaying information associated with the computing resources operated by the customer that may contain and/or generate operational information. The icons may correspond to particular computing resources utilized and/or available to the customer. The webpage 200 may also include a graphical customer element configured as a "back" button 206. The back button 206 may be a graphical user interface element of the webpage 200 where the underlying code of the webpage 200 causes the application displaying the webpage 200 to transmit a command to the computer system providing the management console to return to a previous webpage and/or set in the process.

Once the customer has made a selection using the webpage 200 and selected the next button 204, the application displaying the webpage 200 may submit an HTTP request to the security service to request the operational information for the computing resources included in the selection. The request may be transmitted to one or more servers of the computing resource service provider. Furthermore, the security service may obtain additional information from one or more other services in order to complete the request from the customer. For example, the update service may obtain credentials from a policy service to access the computing resources. In various embodiments, the security service or other service of the computing resource service provider returns, in response to the HTTP request from the customer, identification information configured to identify correlated threat information in response to the customer's HTTP request such that the customer may obtain any correlated threat information based at least in part on the identification information.

In addition, the customer can use the management console illustrated in FIG. 2 to provide additional information and/or preferences to the computing resource service provider. For example, the customer uses the management console to modify settings of various service used by the customer and provided by the computing resource service provider. The security service, as described herein, may include various setting which the customer may modify or enable. For example, the customer can, through the management console, enable the security service to modify application or service setting on behalf of the customer based at least in part on correlated threat information and/or a correlated security model. The security service or other component, such as an agent described in greater detail below in connection with FIG. 5, may modify settings of operating systems, applications, agents, and other services provided by the computing resource service provider on behalf of the customer. The customer may grant access or privileges to the security service to various settings on behalf of the customer.

Figure 3:
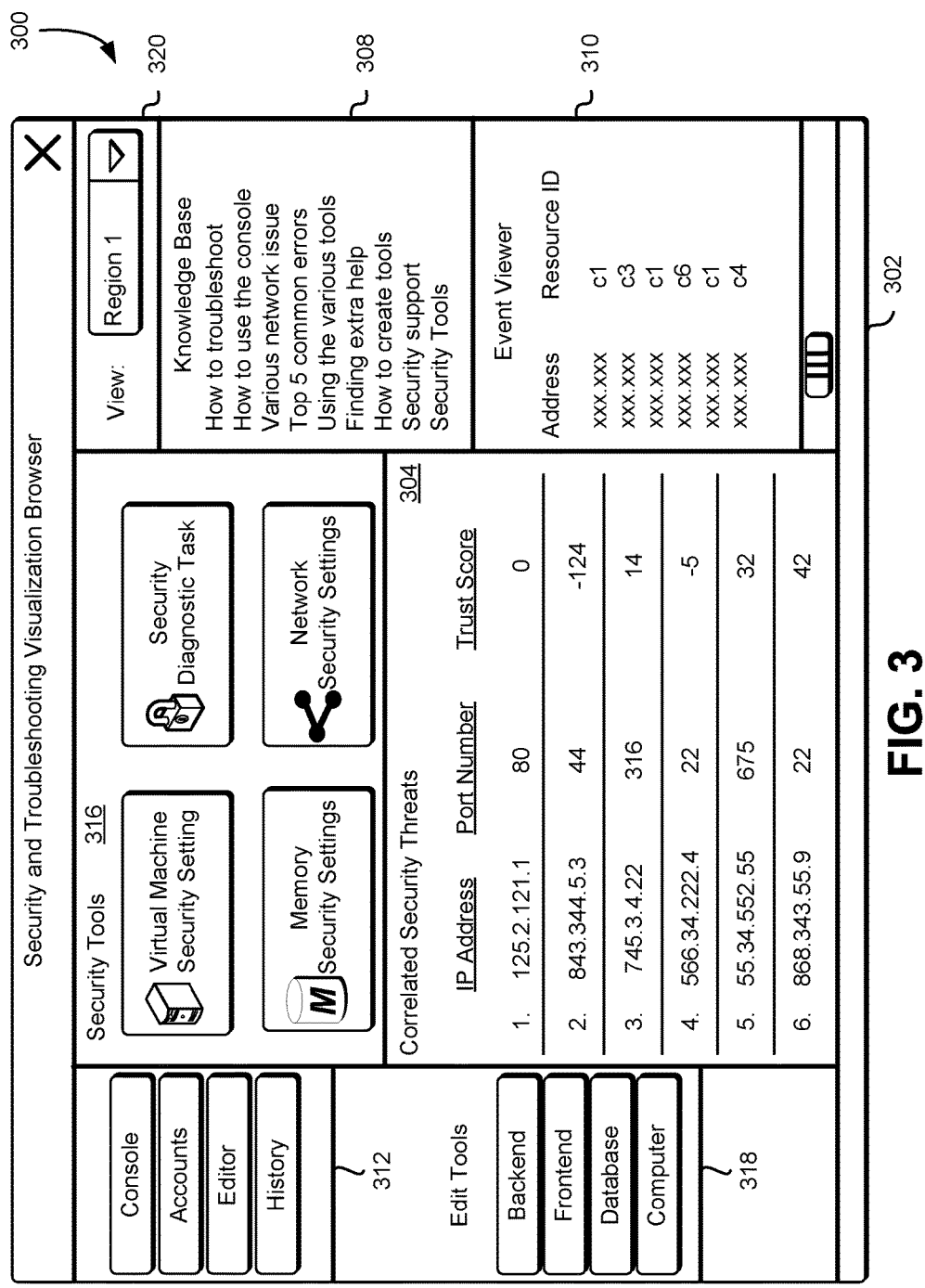
FIG. 3 illustrates an example environment where a remote diagnostic and troubleshooting visualization browser may be used to display correlated security information in accordance with an embodiment.

FIG. 3 illustrates an example environment 300 where a remote diagnostic and troubleshooting visualization browser 302 may be used to display information collected during correlation of operational information obtained from various computing resources operated by different entities as described herein at least in connection with FIG. 1 and in accordance with at least one embodiment. The remote diagnostic and troubleshooting visualization browser 302 may be configured to enable a customer to generate threat information, detect vulnerabilities, perform security operations, troubleshoot issues associated with computing resources operated by the customer, receive recommendations associated with the customer's architecture, search a knowledge base for information related to the computing resources operated by the customer, view customer network scan data, generated customer network scan data, and generally diagnose and troubleshoot issues with the customer computing resources. The remote diagnostic and troubleshooting visualization browser 302 may be configured as a computer service such as a web service and may be provided as a service by the computing resource service provider as described herein at least in connection with FIG. 1.

The remote diagnostic and troubleshooting visualization browser 302 may be provided as a user interface executed by an application, such as a web browser executing on a computer system operated by the customer, as well as other user interfaces that may be used to present computing resource and diagnostic analysis information to a customer and may, in some embodiments, be generated by the computing resource service provider and sent to the customer's display for rendering. In other embodiments, the customer's computing device may include functionality to generate some or all portions of the user interface. For example, the customer's web browser may include code for generating some of the graphics for rendering data received from the computing resource service provider. The service provider may receive the selection information from the customer's computing device and provide the requested information. The user interface may be generated or caused to be generated by a security service as described above at least in connection with FIG. 1.

The remote diagnostic and troubleshooting visualization browser 302 may include security tools 316 that perform various security tasks as described herein and visualization of security information in the remote diagnostic and troubleshooting visualization browser 302. For example, the security tools 316 may include a graphical user interface element, such as the buttons illustrated in FIG. 3, where selection of the graphical user interface element may cause the security service to execute a particular security operation associated with the selected graphical customer element. Once such security tool, as described above, may be configured to generate, by security service or component thereof, correlated threat information and notify the customer, via a display pane or display window of the remote diagnostic and troubleshooting visualization browser 302, of correlated security threats (e.g., events detected based at least in part on the correlated threat information as potential attacks and/or malicious activity).

The remote diagnostic and troubleshooting visualization browser 302 may produce the graphical representation of correlated security threats 304 based at least in part on a set of events detected by one or more computing resources indicated as security threats based at least in part on correlated threat information generated by the security service to be displayed in a display pane of the remote diagnostic and troubleshooting visualization browser 302. For example, the remote diagnostic and troubleshooting visualization browser 302 may, in response to a request from a customer, transmit an API call or other command to the security service to correlate operational information obtained from a plurality of computing resources. In various embodiments, the customer is prompted to provide additional information and/or configure additional resources as a result of correlating the operational information. For example, the customer may be prompted to eliminate one or more vulnerabilities detected by the security service. The graphical representation of correlated security threats may be displayed using tables, block diagrams, generated images, or visualization elements and may, in some embodiments, include one or more icons.

The remote diagnostic and troubleshooting visualization browser 302 may include a set of options 312 used to perform various functions in connection with the remote diagnostic and troubleshooting visualization browser 302. The set of options 312 may be a set of functions included in the remote diagnostic and troubleshooting visualization browser 302 that enables a customer to perform a variety of operations such as managing accounts, creating diagnostic tasks, and managing computing resources. The options 312 may be configured as graphical user interface elements of the remote diagnostic and troubleshooting visualization browser 302.

The account button may be configured to enable the customer to select particular customer accounts to perform diagnostic and troubleshooting operations in connection with the selected customer accounts. In various embodiments, the customer operating the remote diagnostic and troubleshooting visualization browser 302 is required to have, at the minimum, complete read permissions across all of the customer services and computing resources associated with the accounts the customer is attempting to perform diagnostic and troubleshooting operation in connection with. The editor button may be configured to enable the customer to create or edit security tasks, security models, provide additional operational information, or modify what operational information is available to the security service.

In various embodiments, the customer is provided with resources to aid in determining what events may be a greater security risk and require attention. Once operational information is correlated, the customer may be provided with a trust score or other indication of a threat level associated with a detected event. In addition, the correlated threat information may be saved in such a manner that they are accessible to all customer accounts and/or all other customers of the computing resource service provider. In this manner, events detected across various customer accounts may be detected and mitigated. The correlated security information may also be submitted to the computing resource service provider for review and approval and after review, if the correlated security information is found to be of good quality, it may be published to all customers and used as a support tool.

The remote diagnostic and troubleshooting visualization browser 302 may further include an event viewer 310. The event viewer may be configured to provide information related to anomalous or other events detected in operational information. This information may provide a set of data associated with systemic, operational, or maintenance events and the impact on customer computing resources along with schedules and remediation suggestions. The information displayed in the event viewer 310 may be generated automatically or in response to a customer executing a diagnostic task. The remote diagnostic and troubleshooting visualization browser 302 may also include a knowledge base 308 which includes articles and provides access to curated content based at least in part on the information collected from customers of the computing resource service provider or generated by the computing resource service provider. The knowledge base may include suggestions on remedial actions for specific computing resource issues or suggest relevant diagnostic tasks that could provide additional information. In addition, diagnostic tasks may suggest or recommend particular knowledge-based articles based at least in part on a result of the diagnostic task.

Customers while working on a specific issue associated with an account or account group may use the remote diagnostic and troubleshooting visualization browser 302 to provide the technical support service with additional information corresponding to the customer computing resources. The customer may use editing tools 318 to edit or modify existing computing resources. For example, the customer may use the editing tools 318 to edit security settings for one or more computing resources based at least in part on information obtained as a result of correlating operational information.

Once a customer has established a connection to the security service through the remote diagnostic and troubleshooting visualization browser 302, the remote diagnostic and troubleshooting visualization browser 302 may automatically populate the customer's display with the information in various components of the remote diagnostic and troubleshooting visualization browser 302, such as the event viewer and knowledge base. The customer may also be able to choose operational information to include correlation models to execute based at least in part on a recommendations section or search for one using relevant keywords (not shown in FIG. 3 for simplicity). For example, some correlation models may provide an answer to issues directly (e.g., network attack issues) while other correlation models may render a trust score or other visualizations in the display plane (e.g., graphical representations of the network scan). As illustrated in FIG. 3, correlating operational information may return information such as an IP address of various computing resources, one or more open ports of various computing resources, and a trust score associated with the IP address of various computing resources. Other information may be displayed such as other unique identifiers of various computing resources, response times of various computing resources, and any other information obtained by the security service or other computer system correlating the operational information.

As an operation enabled by the remote diagnostic and troubleshooting visualization browser 302, customer can view different regions from a drop down menu 320. The different regions may include different geographical regions or different logical regions within the same or different geographical regions. For example, different regions may include two or more separate virtual networks. Customers may navigate to a particular group using a graphical user interface element as illustrated in FIG. 3. Selection of a particular region may limit the correlated security threat information and generated views to information and operations specific to the region. In various embodiments, the customer uses or creates correlated threat information to monitor the computing resources or regions associated with specific computing resources. The customer may use the remote diagnostic and troubleshooting visualization browser 302 for automated execution of correlation operations (e.g., collection operational information and correlating security threats) in response to a periodic or aperiodic trigger. For example, the customer may select a particular set of computing resources to monitor for security threats and use to update the security threat information.

Figure 4:
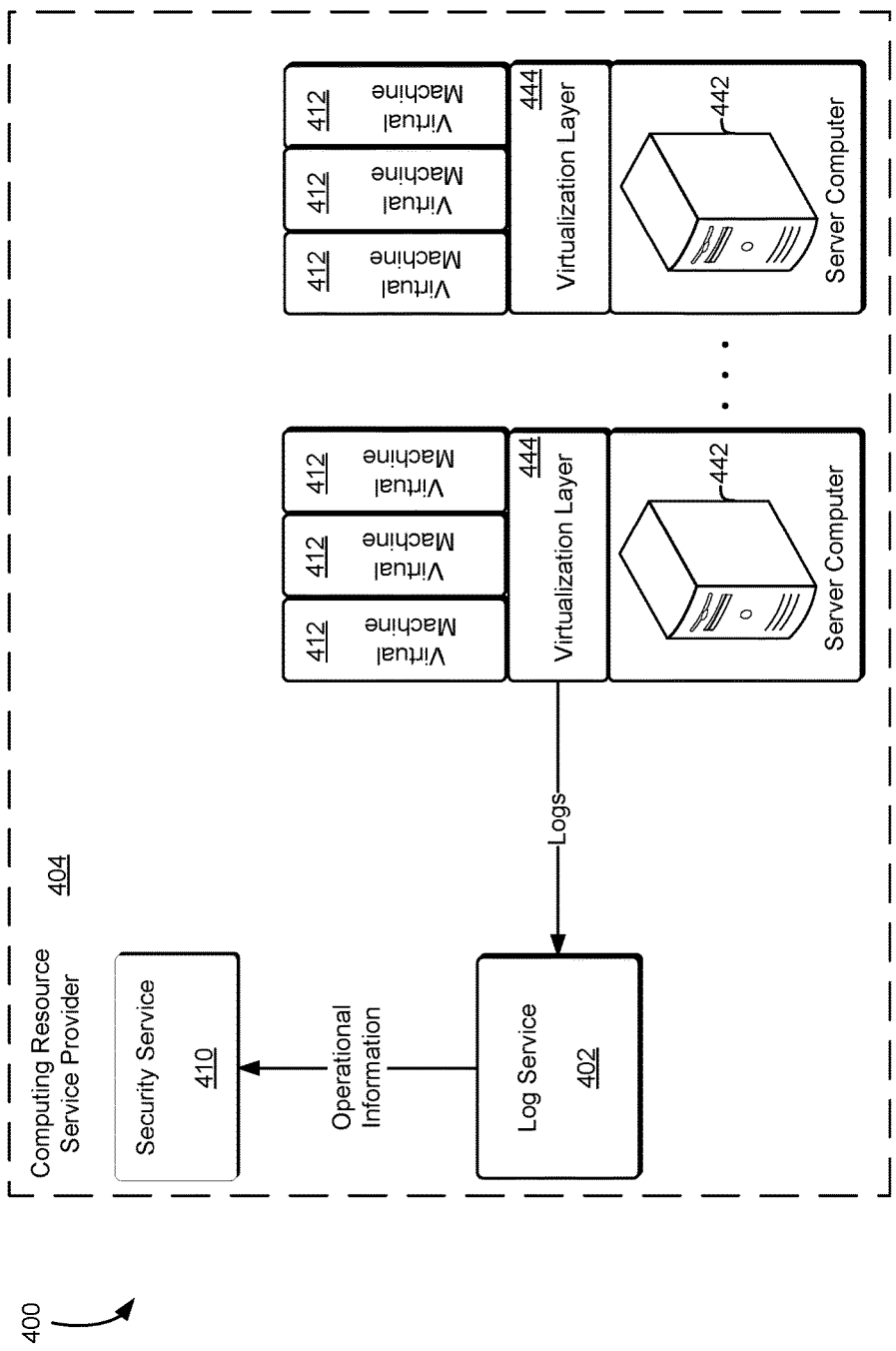
FIG. 4 illustrates an environment in which various aspects correlating operational information across different sources may be implemented in accordance with at least one embodiment.

FIG. 4 illustrates an environment 400 in which a security service 410 of a computing resource service provider 404 may obtain operational information in accordance with at least one embodiment. The security service 410, which may be implemented by physical hardware, is used by the computing resource service provider 404 to provide correlated security information for customers and/or other services of the computing resource service provider 404. The security service 410 may include a group of computing systems, such as the server computers 442 described in detail below, configured correlated security information based at least in part on obtained operational information from customers or other services of the computing resource service provider 404. The physical hardware may include a server computer 442. The server computer 442 may be any device or equipment configured to execute instructions for performing data computation, manipulation, or storage tasks, such as a computer or a server. A server computer 442 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as storage disks and tapes, networking equipment, and the like.

A virtualization layer 444 may include a bare metal hypervisor or a hosted hypervisor. The virtualization layer 444 executing on the server computers 442 enables the physical hardware to be used to provide computational resources upon which one or more virtual machines 412 or other computing resources may operate. For example, the virtualization layer 444 enables a particular virtual machine 412 to access physical hardware on the server computer 442 through virtual device drivers or other executable code on the virtual machine 412. The virtualization layer 444 may include a hypervisor or virtualization software and/or hardware. The virtualization layer 444 may also include an instance of an operating system dedicated to administering the virtual machine 412 or other computing resource executing on the server computer 442. Each virtualization layer 444 may include its own networking software stack, responsible for communication with other virtualization layers 444 and, at least in some embodiments, also responsible for implementing network connectivity between the virtual machine 412 or other computing resources executing on the server computer 442 and virtual machine 412 or computing resources executing on other server computers 442.

Furthermore, the server computer 442 may host multiple virtualization layers 444 of the same or different types on the same server computer 442 as well as virtual machine 412 of the same or different types. For example, a server computers 442 may host a first virtual machine 412 operated by a first customer and may host a second virtual machine 412 that is operated by a second customer. The virtualization layer 444 may be any device, software, or firmware used for providing a virtual computing platform and/or virtualized computing resources for the virtual machine 412 and/or component thereof. The virtual computing platform may include various virtual computer components, such as one or more virtual CPUs, virtual memory, and the like. The virtual machine 412 may be provided to the customers or other service of the computing resource service provider 404 and the customers may utilize the virtual machine 412 or component thereof. Further, the computing resource service provider 404 may use one or more of its own virtual machines 412 for supporting execution of its applications and providing computing resources for such applications.

Commands and other information may be included in an application program interface (API) call from the security service 410 or a log service 408, described in greater detail below, to the virtualization layer 444. The security service 410 enables the customers and other services of the computing resource service provider 404 to manage and operate security settings as well as correlate security threat information. For example, the client may transmit a request to the security service 410 to obtain log information corresponding to a virtual machine 412 to provide the log information to the security service 410 so that the log information may be correlated with other operational information to determine correlated threat information. The request may be an API call including information corresponding to the customer, the log service 408, or the particular virtual machine 412. The security service 408 may determine the corresponding virtualization layer 444 for the virtual machine 412 included in the request and transmit a command to the virtualization layer 444 to obtain operation logs stored locally by the virtual machine 412.

In yet other embodiments, a log pusher (not shown in FIG. 4 for simplicity) is used to obtain logs stored locally by the virtual machines 412 or other computing resources. In these embodiments, the log pusher, described in greater detail below, obtains logs from the server computer 442 or component there such as the virtualization layer 444 and stores the logs in one or more storage devices of the log service 408. The log pusher may be a process or other executable code supported by the virtualization layer 444. The log service 408 may be a group of computer systems configured to store operational information that is accessible to one or more other computer systems, such as the security service 410. In this way, operational information maintained by the log service 402 may be accessed by the security service 410 and/or customers. The log service 408 may be a data warehouse or a non-queryable data storage system. A data storage system and/or data storage device is queryable if data storage system and/or data storage device enable requestors to submit data queries and receive responses to the submitted data queries. For example, the log service 408 may include a database, such as a Structured Query Language (SQL) database, which enables customer, the security service, or other services of the computing resource service provider 404 to query the log service 408 for information contained in the operational information and stored by the log service 408. In another example, the log service 408 may be non-queryable, in so much as, the log service 408 stores operational information (e.g., log files) as data objects which are obtainable by a data object identifier, such as a file name or key, but does not enable queries on information contained in the operational information.

In addition, the log service 408 may aggregate the logs obtained from various computing resources. In another example, the log service 408 may aggregate operational information obtained from the computing resources of a particular network or zone, such as an availability zone or fault zone, which may allow customers or the security service 410 to consume security information from the particular network or zone.

The security service 410 may be responsible for processing operational information obtained from the log service 402. The log service 402 may include a log collector, described in greater detail below, configured to obtain logs from the computing resources. In addition, the log collector may be configured to cause processed logs to be stored by a storage service or other system accessible to the customer or other services of the computing resource service provider 404. For example, the security service 410 may obtain stored logs from the log service 402 and may process the logs to generate correlated threat information. The correlated threat information may then be stored such that the correlated threat information is accessible to the customer or other services of the computing resource service provider 404 to be used to detect and mitigate threats.

Figure 5:
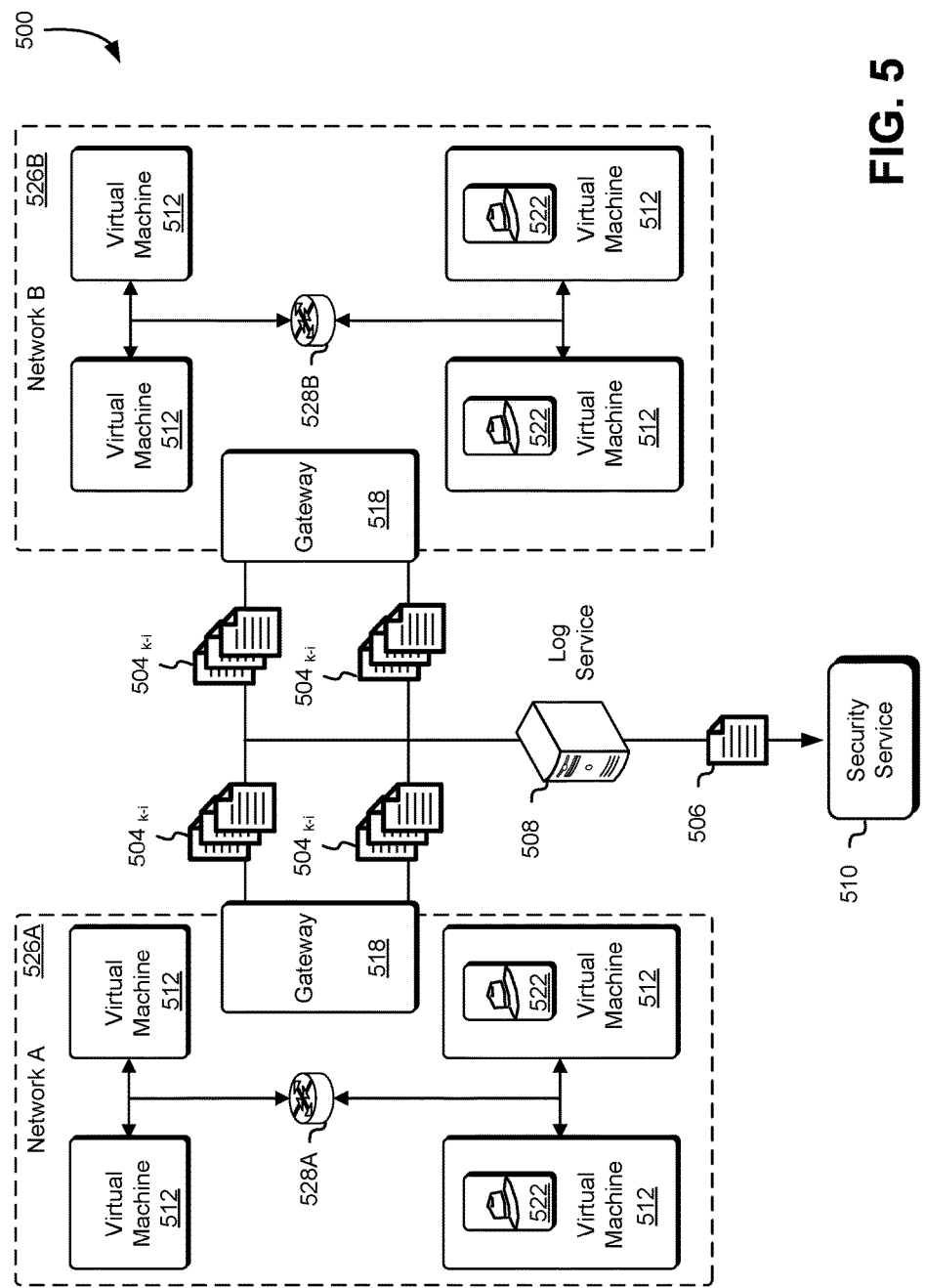
FIG. 5 illustrates an environment in which a log system may collect and distribute operational information from different sources to a security service in accordance with at least one embodiment.

FIG. 5 illustrates an aspect of an environment 500 in which an embodiment may be practiced. Specifically, FIG. 5 depicts the collection and processing of logs 504 generated by computing resources operated by various entities. The environment 500 may include a log service 508 that receives one or more logs 504 from computing resources executed by servers in the sets of racks. For example, a virtualization layer executing on the server computer in the sets of racks enables the physical hardware of the services to be used to provide computational resources upon which one or more virtual machines 512 or other computing resources may operate. For example, the virtualization layer enables a particular virtual machine 512 to access physical hardware on the server computer through virtual device drivers or other executable code on the virtual machine 512. The virtual machines 512 may include any number computer systems and applications executed by customers of the computing resource service provider. For example, the virtual machine 512 includes an operating system, an agent 522, and other applications operated by the customer. In another example, the virtual machine 512 includes an Apache webserver operated by the customer.

The computing resources (e.g., virtual machines 512) may be placed on the service according to a rack diversity constraint, where the sets of racks may be localized by different networks 526A-526B. The logs 504 may include various logs $504_{k-i}$ obtained from different computing resources executed by the servers in the sets of racks. The log service 508 may be a computing system of one or more computing systems configured to obtain logs 504 generated by computing resources as described above in conjunction with FIG. 4. Furthermore, the log service 508 may include computer systems configured to process the logs 504 and generate processed logs 506 which may be consumed by a security service 510, for example, as a stream of data or anonymized logs 504.

The sets of racks may be physical hardware configured to host one or more servers, or, in some embodiments, may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. Additionally, the set of racks may be a "brick server" or other server that is a compact computer server module without a chassis that may include various processors, RAM, I/O, and storage configurations and may be designed to fit into various rack locations. The set of racks may also be connected by a top of rack switch.

The networks 526A-526B may be data communication pathways between one or more electronic devices. The networks 526A-556B may be wired or wireless networks and may use any of a variety of communications protocols for organizing their network traffic. The networks 526A-526B may allow the sharing of files, data, and other types of information between the one or more electronic devices accessible through the data communication pathways. Each of the networks 526A-526B may be associated with a router, such as an aggregation router that aggregates the servers of the respective set of racks into the common network, separate from the router associated with the other network. Each of the networks 526A-526B may be on a different subnet than the other network. For example, as illustrated in FIG. 5, the servers of the set of racks 512A may be commonly connected to a router 528A. Similarly, the servers of the set of racks 512B may be commonly connected to a router 528B. The routers 528A-528B may be networking devices that forward packets between computer networks, such as between the networks 526A-526B.

The environment 500 may also include a gateway 518 that receives network traffic directed to computing systems and/or computing resources, such as virtual machines 512, executed by servers in the sets of racks and enables interfacing with another network, such as the Internet, that may use different protocols. The gateway 518 may contain computing devices such as protocol translators, impedance matching devices, rate converters, fault isolators, or signal translators as necessary to provide system interoperability, such as preforming protocol conversion to enable computing devices to communicate between networks.

The log service 508 may also include a data warehouse or data storage system that stores the processed logs 504 and/or logs 504 such that the logs may be queried. In this manner, the security service 510 may be able to query the processed logs 504 and/or logs 504 for information as well as being provided information corresponding to the processed logs 504 and/or logs 504 through a data stream. In various embodiments, the data stream includes the processed logs 504 and/or logs 504. The security service 510 may be a computer system operated by a computing resource service provider. The logs 504 may be process based at least in part on correlated threat information generated by the security service 510. For example, the security service 510 may model particular customer behavior and determine that various connection attempts are standard customer behavior. The log service 508 may then be configured to process the log 504 to remove information corresponding to the modeled customer behavior.

The agent 522, as illustrated in FIG. 5, may include executable code that provides additional information to the security service 510. The agent 522 may be a process or application executed by the virtual machine 512. The additional information may include a variety of different information suitable for correlating with the logs 504 or other information obtained from customers or service of the computing resource service provider. The agent 522 may execute one or more "hooks" in a kernel of an operating system of the virtual machines 512. For example the agent 522 may execute a hook that intercepts messages generated by the operating system when processes are created or terminated by the operating system or other software executed by the virtual machine 512. The executable code that handles such intercepted function calls, events, or messages may be referred to in the context of the present disclosure as a "hook." Executing a hook by the agent 522 or other entity as described herein covers a range of techniques which may be used to alter or augment the behavior of an operating system, applications, or of other executable code by at least intercepting function calls, messages, or events passed between applications, including the operating system. The agent 522 may then generate a stream of additional information corresponding various hooks executed by the agent 522 and provide the stream to the security service 510. For example, the agent 522 may provide the security service 510 with a complete file path to a binary associated with a process that has been executed or terminated within the virtual machines 512.

As illustrated in FIG. 5, the agent 522 may be executed by a portion of the virtual machines 512. For example, only a portion of the customers of the computing resource service provider may wish to have the agent 522 installed and executed by virtual machines 512 operated by the customer. The agent 522 may also obtain additional information associated with the configuration of the customer's virtual machine 512. For example, the agent may determine that a firewall integrated with an operating system executed by the virtual machine 512 is disabled. The security service 510 may also communicate with the agent 522 and/or transmit commands to the agent 522. For example, the security service 510 can transmit a command to the agent 522 to modify a configuration of the customer's virtual machine 512. Returning to the example above, the security service 510 determines, based at least in part on a correlated security model, that disabling the integrated firewall of the operating system exposes a security risk and transmits a command to the agent 522 to enable the integrated firewall and to modify one or more setting of the firewall to mitigate potential security threats.

The security service 510 may correlate information obtained from the agents and/or operational information with other information obtained from other customers or other services of the computing resource service provider. For example, the security service 510 may identify malicious activity indicated in operational information at various levels from various sources. For instance, logs 504 indicating network activity from a firewall operated by the computing resource service provider may indicate a set of IP addresses establishing network connections with virtual machines 512. The agent 522 may provide additional information indicating file paths and binaries executed by the virtual machine 512 around the time of the network connections where established. In addition, an intrusion detection system may provide hashes of known malware which may be compared to the binaries executed by the virtual machines 512. Other sources of operational information may include computing resource utilization, for example, processor load or load on various storage devices.

This information may be correlated by the security service 510 to determine a sub set of the IP address associated with malicious activity (e.g., the binaries executed by the virtual machines 512 match known malware). This correlated security model may then be used to update firewall setting to block the subset of IP addresses associated with malicious activity. In another example, the security service 510 observes the same IP address attempting to connect to 100 different customer virtual machines 512. The security service 510 can then transmit an alarm to the 100 different customers and update the correlated security model to indicate the IP address is associated with malicious activity.

Figure 6:
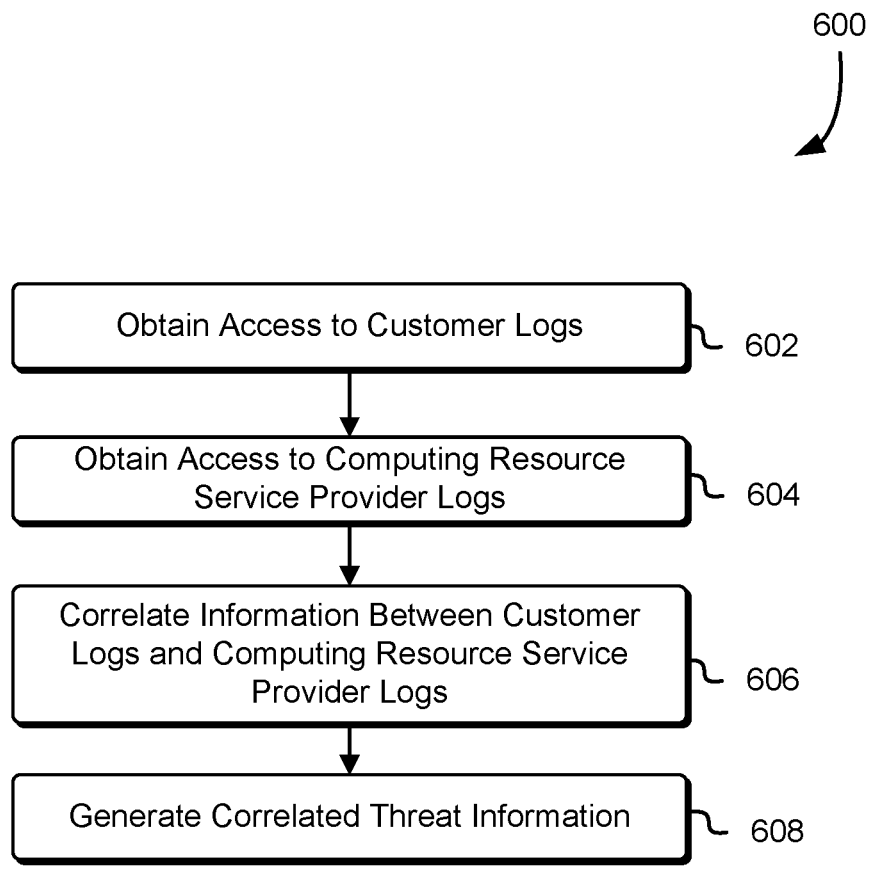
FIG. 6 shows an illustrative process which may be used to generate a correlated security model in accordance with at least one embodiment.

FIG. 6 is a block diagram illustrating an example of a process 600 for generating correlated threat information based at least in part on operational information obtained from computing resources operated by different entities in accordance with at least one embodiment. The process 600 may be performed by any suitable system such as a security service as described above in connection with FIGS. 1 and 4. The process 600 includes obtaining access to customer logs 602. The customer may provide access to the customer logs through a management console or other interface as described above. In addition, the customer may provide access to the customer logs simply by requesting access to or the generation of correlated threat information. Access to the customer log may require the security service or other system executing the process 600 to obtain credential information to access customer operated computing resources.

The security service or other system executing the process 600 may then obtain access to the computing resource service provider logs 604. The computing resource service provider may automatically provide the security service or other system executing the process 600 access to the logs based at least in part on the computing resources service provider having ownership of the systems and processes implementing the security service. Furthermore, obtaining access to the logs and other operational information may include copying the logs and other operational information to a storage device or memory local to the security service or other system executing the process 600. In another example, the logs may be streamed by a log service or stream service to the security service.

The security service or other system executing the process 600 may then correlate operational information between the customer logs and the computing resource service provider logs 606. Correlating operational information between the customer logs and the computing resource service provider logs may include clustering the events based on some feature or set of features included in the customer logs and the computing resource service provider logs. For example, the security service may determine a number of failed log-in attempts based on source IP address. In another example, machine learning algorithms may be used and trained based at least in part on features included in the customer logs and the computing resource service provider logs. The machine learning algorithms may then generate a model based on a training set of data. The model may then be used to detect anomalous events from the operational information, including a stream of events published to the security service. Other methods of correlating operational information included in the customer logs and the computing resource service provider logs such as statistical methods and heuristics may be used as well.

The security service or other system executing the process 600 may then generate correlated threat information 608. Generating correlated threat information may include identifying a set of events in the customer logs or other operational information that may be associated with an attack or other anomalous activity. Generating correlated threat information may also include obtaining and/or calculating a trust score for a particular event as described above. For example, a set of trust scores may be maintained by the security service and may be modified based at least in part on observed behavior. For example, a failed log-in attempt may result in the security service lowering a trust score associated with an IP address or other identifier corresponding to the failed log-in attempt. In numerous variations to the process 600, the correlated threat information is provided to the customer as described above.

Figure 7:
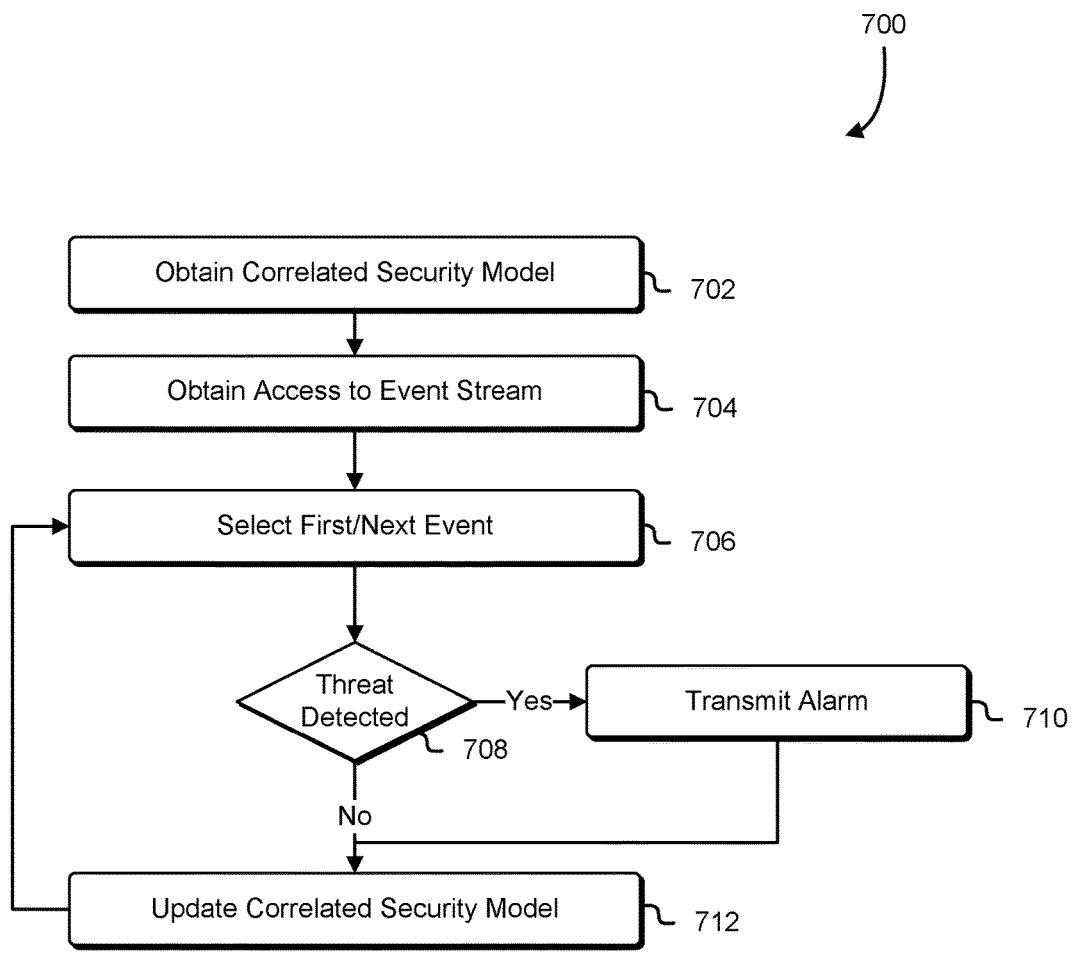
FIG. 7 shows an illustrative process which may monitor security threats based at least in part on a security model in accordance with at least one embodiment.

FIG. 7 is a block diagram illustrating an example of a process 700 for detecting a security threat based at least in part on a correlated security model in accordance with at least one embodiment. The process 700 may be performed by any suitable system such as a security service as described above in connection with FIGS. 1 and 4. The process 700 includes obtaining a correlated security model 702. The correlated security model may be generated by the security service using the process 600 described above in connection with FIG. 6. In addition, the correlated security model may be based at least in part on a set of customers of the computing resource service provider. The correlated security model may be generated based at least in part on one or more machine learning algorithms. Furthermore, the correlated security model include a set of rules of heuristics for determine whether an event is a sufficient security risk such that an alarm is to be transmitted.

The security service or other system executing the process 700 may then obtain access to an event stream. The security service may obtain access to an event stream from a customer of the computing resource service provider. The event stream may be associated with a single customer and/or computing resources or may be associated with a plurality of customers and/or a plurality of computing resources. As described above, the event stream may be generated based at least in part on logs and/or operational information from computing resources. In addition, a log service or other service of the computing resource service provider may process the logs and/or operational information prior to publishing events corresponding to the logs and/or operational information to the event stream. For example, the customer may exclude certain events or certain information included in event from the event stream.

The security service or other system executing the process 700 may then select the first/next event in the event stream 706. Selecting the event may include receiving an event from the log service. The event may be one or more entries in a log or set of logs. The security service may then determine if a threat is detected based at least in part on the obtained correlated security model 708. For example, the event may indicate an anomalous level of activity from a network block or set of network addresses in a particular geographic region. In addition, the correlated security model may indicate that the customer has never logged in from the particular geographic region. Furthermore, the correlated security model may indicate that at least one other customer has experienced an attack from the particular geographic region. If the security service detects a threat, then the security service or other service of the computing resource service provider, such as a notification service, may transmit an alarm 710. The alarm may be transmitted as an e-mail, telephone call, Short Message Service (SMS), video message, pop-up window, or any other suitable mechanism for notifying a customer. The alarm may be transmitted to one or more locations via one or more mechanisms.

In addition, regardless of whether a threat was detected in the event, the security service may then update the correlated security model based at least in part on the event 712. For example, if a threat was detected the security service may reduce a trust score associated with the event. In another example, if a threat was detected the security service may update one or more rules included in the correlated security model. If no threat was detected this may indicate that a trust score may be increased. The security service or other system executing the process 700 may then select the next event and continue the process 700.

In numerous variation to the process 700, the security service or other system executing the process 700 may track or record determination associated with various events and may perform additional operations based at least in part on these tracked or recorded determinations. For example, the security service or other system executing the process 700 may determine that no malicious activity has been detected in the event stream in the last 24 hours based at least in part on the obtained correlated security model. As a result, the security service or other system executing the process 700 may cause the obtained correlated security model to be modified or updated. The failure to detect malicious activity may indicate an error in the correlated security model. The determinations as to whether an event indicates malicious activity based at least in part on the correlated security model may be classified and monitored to determine an effectiveness of the correlated security model.

Figure 8:
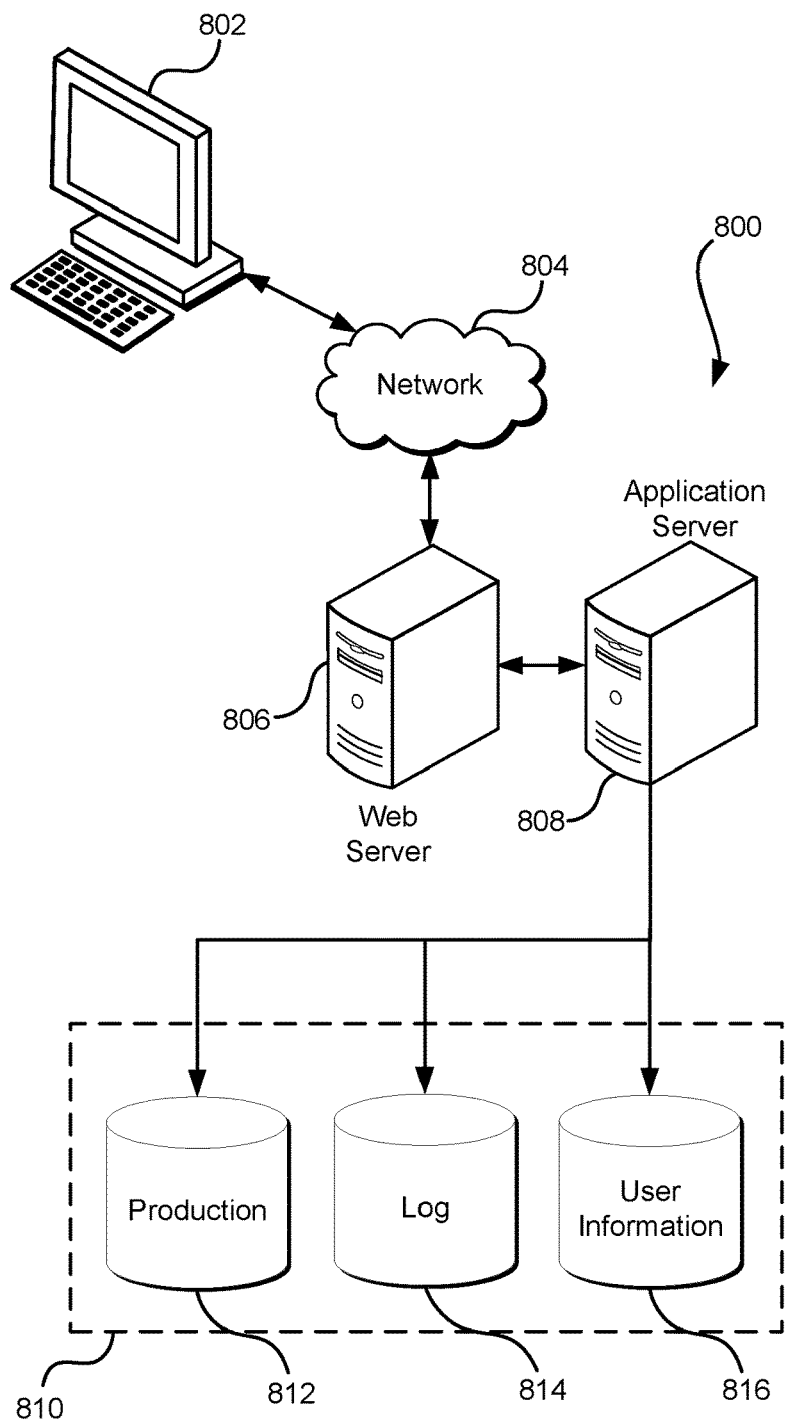
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a customer of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the customer, which may be served to the customer by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the customer audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and customer information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a customer, through a device operated by the customer, might submit a search request for a certain type of item. In this case, the data store might access the customer information to verify the identity of the customer and can access the catalog detail information to obtain information about items of that type. The information then can be returned to the customer, such as in a results listing on a web page that the customer is able to view via a browser on the client device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more customer computers, computing devices, or processing devices that can be used to operate any of a number of applications. Customer or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), Customer Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from customer devices, such as by executing one or more web applications that may be implemented as one or more scripts or programs written in any programming language, such as Java®, C, C#, C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method, or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
prompting a customer for access to a first set of logs generated by a first set of computing resources operated by the customer and provided to the customer by a computing resource service provider, where the first set of logs are generated by a first set of applications executing at an operating system level and above;
obtaining a second set of logs generated by a second set of computing resources operated by the computing resource service provider, where the second set of logs are generated by a second set of applications executing at a hypervisor level and below;
generating correlated threat information by at least correlating at least a first portion of the first set of logs and at least a second portion of the second set of logs using a clustering algorithm; and
providing the correlated threat information to the customer.

2. The computer-implemented method of claim 1, wherein the computer-implemented method further comprises:
correlating the correlated threat information with a third set of logs obtained from at least one other customer; and
wherein correlating the first portion of the first set of logs and the second portion of the second set of logs using the clustering algorithm further comprises clustering, based at least in part on a set of features of one or more events, the one or more events included in the first set of logs and the second set of logs.

3. The computer-implemented method of claim 1, wherein the computer-implemented method further comprises:
generating additional threat information based at least in part on the second set of logs; and
wherein generating the correlated threat information further comprises correlating the first set of logs with the additional threat information.

4. The computer-implemented method of claim 1, wherein the computer-implemented method further comprises:
receiving, from an events stream, additional logs generated by the first set of computing resources operated by the customer as a result of prompting the customer for access; and
detecting anomalous activity included in the additional logs based at least in part on the correlated threat information.

5. A system, comprising:
one or more processors; and
memory that includes instructions that, as a result of execution by the one or more processors, cause the system to:
obtain first operational information from a first set of computing resources associated with a customer;
generate threat information by at least:
obtaining one or more events included in the operational information; and
correlating the one or more events with second operational information from a second set of computing resources of a computing resource service provider, the second operational information generated by a set of applications executing at a hypervisor level and below; and
provide the threat information to at least one other system.

6. The system of claim 5, wherein obtaining first operational information further comprises obtaining one or more logs generated by the first set of computing resources associated with the customer.

7. The system of claim 5, wherein the memory further comprises instructions that, when executed by the one or more processors, cause the system to:
obtain information corresponding to one or more network events associated with by the first set of computing resources associated with the customer; and
wherein correlating the one or more events with second operational information further comprises correlating the information corresponding to the one or more network events.

8. The system of claim 5, wherein obtaining the one or more events included in the operational information further comprises obtaining information corresponding to one or more application processes executed by the first set of computing resources associated with the customer.

9. The system of claim 5, wherein generating the threat information further comprises generating a set of heuristics based at least in part on a result of correlating the one or more events with the second operational information.

10. The system of claim 9, wherein the memory further comprises instructions that, when executed by the one or more processors, cause the system to detect anomalous activity based at least in part on the set of heuristics.

11. The system of claim 5, wherein at least a portion of the second operational information is obtained from computing resource operated by one or more other customers.

12. The system of claim 5, the memory further comprises instructions that, when executed by the one or more processors, cause the system to transmit an alarm as a result of detecting anomalous activity in the threat information.

13. A non-transitory computer-readable storage medium having stored thereon executable instructions that, as a result of being executed by one or more processors of a computer system, cause the computer system to at least:
obtain a first set of operational information from computing resources operated by a customer, the computing resources provided by a computing resource service provider and connected by a network operated by the computing resource service provider;
obtain a second set of operational information from computing resources operated by a computing resource service provider, the second set of operational information generated by a set of applications executing at or below a hypervisor level;

correlate the first set of operational information and the second set of operational information; and detect anomalous activity based at least in part of a result of correlating the first set of operational information and the second set of operational information.

14. The non-transitory computer-readable storage medium of claim 13, wherein the instructions further comprise instructions that, as a result of being executed by the one or more processors, cause the computer system to transmit an alarm to the customer as a result of detecting anomalous activity.

15. The non-transitory computer-readable storage medium of claim 13, wherein the instructions that cause the computer system to obtain the first set of operational information further include instructions that cause the computer system to obtain at least a portion of the first set of operational information from a host-based firewall implemented by the customer on computing resources operated by the customer.

16. The non-transitory computer-readable storage medium of claim 13, wherein the instructions that cause the computer system to obtain the second set of operational information further include instructions that cause the computer system to obtain at least a portion of the second set of operational information from one or more services implemented by the computing resource service provider.

17. The non-transitory computer-readable storage medium of claim 13, wherein the instructions further comprise instructions that, as a result of being executed by the one or more processors, cause the computer system to:

obtain a third set of operational information from computing resources operated by a second customer; and correlate the first set of operational information, the second set of operational information, and the third set of operational information.

18. The non-transitory computer-readable storage medium of claim 17, wherein the instructions that cause the computer system to correlate the first set of operational information, the second set of operational information, and the third set of operational information further include instructions that cause the computer system to correlate the first set of operational information, the second set of operational information, and the third set of operational information using a machine learning algorithm.

19. The non-transitory computer-readable storage medium of claim 13, wherein the instructions further comprise instructions that, as a result of being executed by the one or more processors, cause the computer system to modify one or more security settings of computing resources based at least in part on the result of correlating the first set of operational information and the second set of operational information based at least in part on an indication from the customer to modify the one or more security settings.

20. The non-transitory computer-readable storage medium of claim 13, wherein the instructions further comprise instructions that, as a result of being executed by the one or more processors, cause the computer system to distribute the result of correlating the first set of operational information and the second set of operational information to one or more destinations.

* * * * *